US011635411B2

(12) United States Patent
Ito et al.

(10) Patent No.: US 11,635,411 B2
(45) Date of Patent: Apr. 25, 2023

(54) ULTRASONIC INSPECTION APPARATUS AND ULTRASONIC INSPECTION METHOD

(71) Applicant: SINTOKOGIO, LTD., Nagoya (JP)

(72) Inventors: Yuuka Ito, Toyokawa (JP); Eiji Yamaguchi, Toyokawa (JP); Nayuta Horie, Toyokawa (JP); Mizuki Okubo, Toyokawa (JP)

(73) Assignee: SINTOKOGIO, LTD., Nagoya (JP)

( * ) Notice: Subject to any disclaimer, the term of this patent is extended or adjusted under 35 U.S.C. 154(b) by 0 days.

(21) Appl. No.: 17/064,780

(22) Filed: Oct. 7, 2020

(65) Prior Publication Data

US 2021/0109067 A1 Apr. 15, 2021

(30) Foreign Application Priority Data

Oct. 11, 2019 (JP) .............................. JP2019-187887

(51) Int. Cl.
  *G01N 29/44* (2006.01)
  *G01N 29/06* (2006.01)
  *G01N 29/26* (2006.01)

(52) U.S. Cl.
  CPC ..... *G01N 29/4445* (2013.01); *G01N 29/0654* (2013.01); *G01N 29/26* (2013.01); *G01N 2291/044* (2013.01); *G01N 2291/26* (2013.01)

(58) Field of Classification Search
  CPC ........... G01N 29/4445; G01N 29/0654; G01N 29/26; G01N 29/4454; G01N 29/4463; G01N 29/043; G01N 29/225; G01N 29/11; G01N 29/265; G01N 29/42; G01N 29/48; G01N 2291/044; G01N 2291/26; G01N 2291/02491
  See application file for complete search history.

(56) References Cited

U.S. PATENT DOCUMENTS

| 4,901,575 A | * | 2/1990 | Bohannan | ................ G01H 1/00 73/587 |
| 2005/0087016 A1 | * | 4/2005 | Gilmore | ................ G01N 29/12 73/579 |
| 2010/0242607 A1 | * | 9/2010 | Oruganti | ............ G01N 29/4472 73/579 |

FOREIGN PATENT DOCUMENTS

JP  2005-106636 A  4/2005
WO  WO-2013161835 A1 * 10/2013 ............. G01N 29/07

OTHER PUBLICATIONS

Fierro Gian Piero Malfense et al., "Nonlinear ultrasonic stimulated thermography for damage assessment in isotropic fatigued structures," Journal of Sound and Vibration, Elsevier, Amsterdam, NL, vol. 404, May 27, 2017, p. 102-p. 115, XP085061750.

* cited by examiner

*Primary Examiner* — Suman K Nath
(74) *Attorney, Agent, or Firm* — Faegre Drinker Biddle & Reath LLP

(57) ABSTRACT

An ultrasonic inspection apparatus includes: an acquisition unit acquiring a signal indicating a fundamental wave and a second harmonic of an ultrasonic wave, which are obtained by the ultrasonic wave being scanned over an inspection object through a medium, at each scanning position; a calculation unit calculating a value obtained by dividing a second harmonic amplitude by a square of a fundamental wave amplitude, at each scanning position; and an output unit outputting information on a defect of the inspection object, based on the value obtained by dividing the second harmonic amplitude by the square of the fundamental wave amplitude.

2 Claims, 6 Drawing Sheets

ULTRASONIC INSPECTION APPARATUS AND ULTRASONIC INSPECTION METHOD

CROSS-REFERENCE TO RELATED APPLICATION

This application is based on Japanese Patent Application No. 2019-187887 filed with Japan Patent Office on Oct. 11, 2019, the entire contents of which are hereby incorporated by reference.

TECHNICAL FIELD

The present disclosure relates to an ultrasonic inspection apparatus and an ultrasonic inspection method.

BACKGROUND

Japanese Unexamined Patent Publication No. 2005-106636 discloses an apparatus for detecting a defect of a metal member by an immersion nonlinear ultrasonic method. This apparatus sends an ultrasonic wave (sine burst wave) to a metal member arranged in water and receives the ultrasonic wave having penetrated therethrough. This apparatus detects a defect in a metal member based on a value of $A_2/A_1$ obtained by dividing the second harmonic amplitude $A_2$ by the fundamental wave amplitude (incident wave amplitude) $A_1$, of the ultrasonic wave having penetrated.

SUMMARY

The immersion nonlinear ultrasonic method detects the defects of the metal member by using the ultrasonic waves propagating through water which is a medium, so that the nonlinearity of water gives an effect on the fundamental wave amplitude $A_1$ and the second harmonic amplitude $A_2$ of the ultrasonic waves. The effect that nonlinearity of water gives is not always the same for each of the fundamental wave amplitude $A_1$ and the second harmonic amplitude $A_2$. Therefore, in defects of inspection objects that the apparatus described in Japanese Unexamined Patent Publication No. 2005-106636 detects based on the value of $A_2/A_1$, erroneous detections due to the nonlinearity of water may be included.

The present disclosure provides an ultrasonic inspection apparatus capable of improving the inspection accuracy of defects of inspection objects.

The ultrasonic inspection apparatus according to the present disclosure includes: an acquisition unit acquiring a signal indicating a fundamental wave and a second harmonic of an ultrasonic wave, in which the fundamental wave and the second harmonic are obtained by the ultrasonic wave being scanned over an inspection object through a medium, at each scanning position; a calculation unit calculating a value obtained by dividing the second harmonic amplitude by a square of the fundamental wave amplitude, at each scanning position; and an output unit outputting information on a defect of the inspection object, based on the value obtained by dividing the second harmonic amplitude by the square of the fundamental wave amplitude.

In this ultrasonic inspection apparatus, the signal, which indicates the fundamental wave and the second harmonic of the ultrasonic wave obtained by scanning the inspection object, is acquired by the acquisition unit at each scanning position. Then, the value obtained by dividing the second harmonic amplitude by the square of the fundamental wave amplitude is calculated by the calculation unit, at each scanning position. The fundamental wave amplitude of the ultrasonic waves is described as a linear function of the fundamental wave amplitude in which a nonlinearity of the medium is reflected. Then, the second harmonic amplitude of the ultrasonic wave is described as a quadratic function of the fundamental wave amplitude in which the nonlinearity of the medium is reflected. That is, in the second harmonic amplitude of the ultrasonic wave and the squared value of the fundamental wave amplitude of the ultrasonic wave, effects which the nonlinearity of the medium give on the amplitudes are at the same degree. In a state where the effect due to the nonlinearity of the medium is reduced by using the ratio of the second harmonic amplitude of the ultrasonic wave to the squared value of the ultrasonic fundamental wave amplitude, this ultrasonic inspection apparatus can describe the relationship between the second harmonic amplitude and the fundamental wave amplitude. Therefore, this ultrasonic inspection apparatus can improve a detection accuracy for the defect of the inspection object, compared with that in the case of detecting a defect of the inspection object based on the value of a ratio $(A_2/A_1)$ between the second harmonic amplitude of ultrasonic waves and the fundamental wave amplitude of ultrasonic waves.

In one embodiment, the output unit may output an image as information on the defect of the inspection object. In this case, the ultrasonic inspection apparatus can visualize the position of the defect of the inspection object.

In one embodiment, the calculation unit may calculate a value obtained by dividing the second harmonic amplitude by the fundamental wave amplitude, at each scanning position, and the output unit may output the information on the defect of the inspection object, based on a value obtained by dividing the second harmonic amplitude by the fundamental wave amplitude and a value obtained by dividing the second harmonic amplitude by the square of the fundamental wave amplitude. The fundamental wave amplitude and the second harmonic amplitude change depending on the reflectance of the ultrasonic waves at the interface between the medium and the inspection object and the reflectance of the ultrasonic waves at the defect of the inspection object. Further, in the fundamental wave amplitude and the second harmonic amplitude, effects which the reflectance gives on the amplitudes are at the same degree. In a state that the effects due to the reflectance are reduced by using the ratio between the ultrasonic fundamental wave amplitude and the ultrasonic second harmonic amplitude, this ultrasonic inspection apparatus can describe the relationship between the ultrasonic fundamental wave amplitude and the ultrasonic second harmonic amplitude. Therefore, this ultrasonic inspection apparatus can use the ratio between the second harmonic amplitude of the ultrasonic wave and the fundamental wave amplitude of the ultrasonic wave to reduce the effects which the reflectance of the ultrasonic wave gives on the amplitudes.

An ultrasonic inspection method according to another aspect of the present disclosure includes: acquiring a signal indicating a fundamental wave and a second harmonic of an ultrasonic wave, in which the fundamental wave and the second harmonic are obtained by the ultrasonic wave being scanned over an inspection object through a medium, at each scanning position; calculating a value obtained by dividing the second harmonic amplitude by a square of the fundamental wave amplitude, at each scanning position; and outputting information on a defect of the inspection object, based on the value obtained by dividing the second harmonic amplitude by the square of the fundamental wave amplitude.

In this ultrasonic inspection method, signals indicating the fundamental wave and the second harmonic of ultrasonic waves, which are obtained by scanning the inspection object, are acquired at each scanning position. Then, a value obtained by dividing the second harmonic amplitude by the square of the fundamental wave amplitude is calculated. In other word, in the state where the effect due to the nonlinearity of the medium is reduced by using the ratio of the second harmonic amplitude of the ultrasonic wave to the squared value of the ultrasonic fundamental wave amplitude, this ultrasonic inspection method can describe the relationship between the second harmonic amplitude and the fundamental wave amplitude. Therefore, this ultrasonic inspection method can improve the detection accuracy for the defect of the inspection object.

An ultrasonic inspection apparatus according to another aspect of the present disclosure includes: an acquisition unit configured to acquire a signal indicating a fundamental wave and a second harmonic of an ultrasonic wave, the fundamental wave and the second harmonic being obtained by the ultrasonic wave being scanned over an inspection object through a medium, at each scanning position; and an output unit configured to output an image related with the inspection object. The image has pixel values corresponding to each of the scanning position, and the pixel values are values obtained by applying a predetermined pixel value conversion rule to values obtained by dividing the second harmonic amplitude at the corresponding scanning position by the square of the fundamental wave amplitude. In this ultrasonic inspection apparatus, the signal, which indicates the fundamental wave and the second harmonic of the ultrasonic wave obtained by scanning the inspection object, is acquired by the acquisition unit at each scanning position. Then, the image related with the inspection object is outputted by the output unit. The image has pixel values corresponding to each of the scanning position, and the pixel values are values obtained by applying a predetermined pixel value conversion rule to values obtained by dividing the second harmonic amplitude at the corresponding scanning position by the square of the fundamental wave amplitude. Therefore, in a state that the effects due to the reflectance are reduced by using the ratio between the ultrasonic fundamental wave amplitude and the ultrasonic second harmonic amplitude, this ultrasonic inspection apparatus can visualize the relationship between the ultrasonic fundamental wave amplitude and the ultrasonic second harmonic amplitude.

According to the ultrasonic inspection apparatus of the present disclosure, it is possible to improve the detection accuracy for the defect of the inspection object.

DETAILED DESCRIPTION

Figure 1:
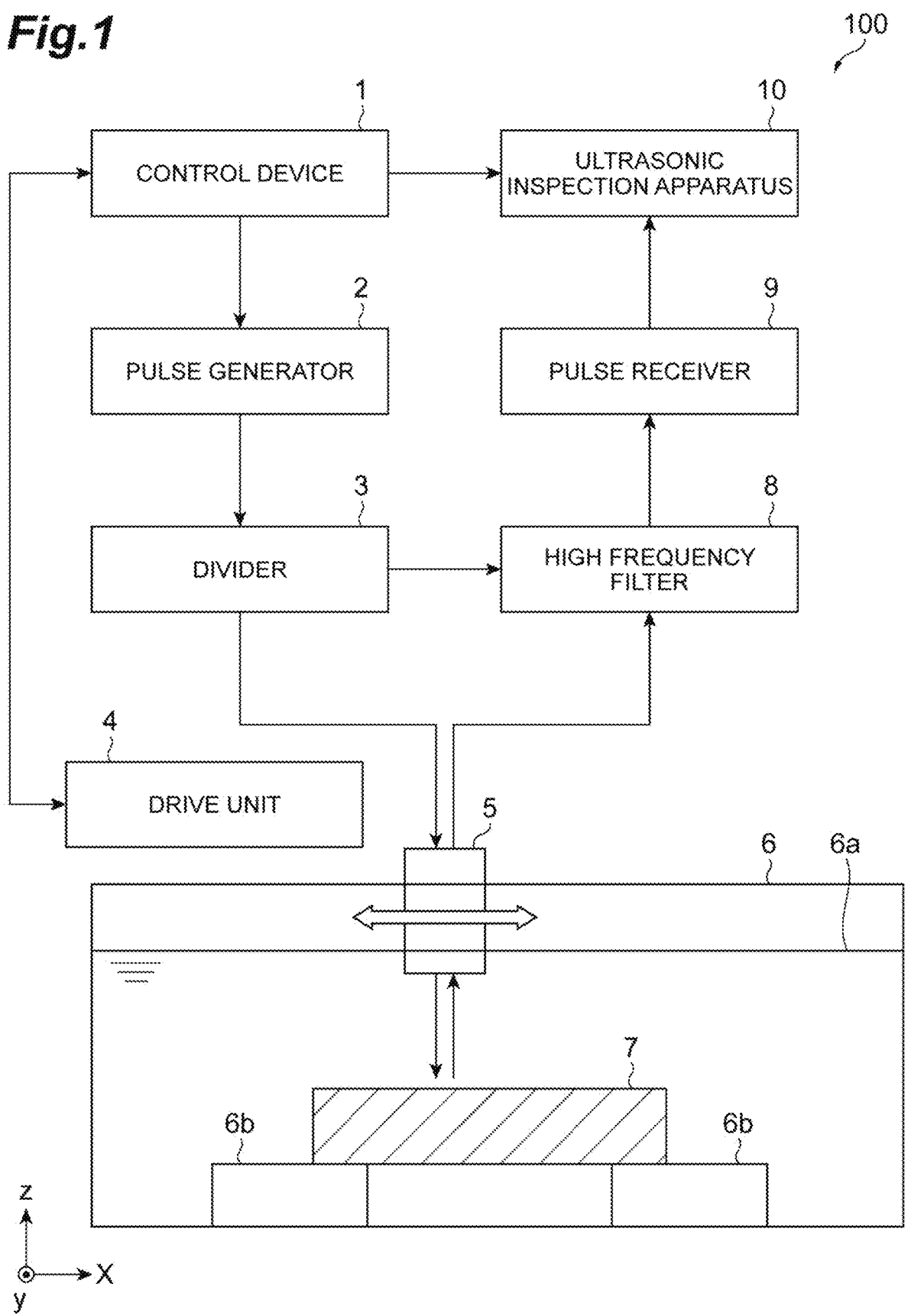
FIG. 1 is a schematic diagram showing an example of an ultrasonic inspection apparatus system.

Embodiments of the present disclosure are described below with reference to drawings. Note that, in the following description, the same or corresponding elements are denoted by the same reference symbols, and no redundant description is repeated. The dimensional ratios in the drawings do not always correspond with those in the description. The terms "upper", "lower", "left" and "right" are based on the states shown in figures and are for convenience.

[Configuration of Ultrasonic Inspection System]

FIG. 1 is a schematic diagram showing an example of an ultrasonic inspection apparatus system. The X direction and the Y direction in the figure are horizontal directions, and the Z direction represents a vertical direction. The X direction, the Y direction, and the Z direction are axis directions orthogonal to each other in a rectangular coordinate system in a three-dimensional space. The ultrasonic inspection system 100 includes a control device 1, a pulse generator 2, a divider 3, a drive unit 4, an ultrasonic probe 5, a water tank 6, an inspection object 7, a high frequency filter 8, a pulse receiver 9, and an ultrasonic inspection apparatus 10. The ultrasonic inspection system 100 scans the inspection object 7 with ultrasonic waves and outputs information on defects of the inspection object 7.

The control device 1 is configured with a general-purpose computer having an arithmetic device such as a CPU (Central Processing Unit), a storage device such as a ROM (Read Only Memory), a RAM (Random Access Memory) and an HDD (Hard Disk Drive), and a communication device. The control device 1 is connected to the pulse generator 2, the drive unit 4, and the ultrasonic inspection apparatus 10.

The pulse generator 2 generates a voltage and causes the ultrasonic probe 5 to generate an ultrasonic wave. The pulse generator 2 changes the waveform of the voltage according to an instruction from the control device 1. The pulse generator 2 is connected to the ultrasonic probe 5 and the high frequency filter 8 via the divider 3. The pulse generator 2 causes the ultrasonic probe 5 to generate an ultrasonic wave according to a voltage. As an example, the pulse generator 2 causes the ultrasonic probe 5 to generate a sine burst wave. A sine burst wave is an ultrasonic wave of a sine wave that is generated instantaneously. The amplitude or frequency of a sine burst wave is determined by the waveform of a voltage that the pulse generator 2 generates.

The drive unit 4 is arranged above the water tank 6 and includes a plurality of movable shafts that move the ultrasonic probe 5. The plurality of movable shafts are configured with, for example, ball screw mechanisms in the X-axis direction, the Y-axis direction, and the Z-axis direction. The ball screw mechanism is driven by a servomotor. The drive unit 4 moves the ultrasonic probe 5 according to an instruction from the control device 1. The drive unit 4 feeds back the position information of the ultrasonic probe 5 to the control device 1.

The ultrasonic probe 5 receives a voltage from the pulse generator 2 and generates an ultrasonic wave. The ultrasonic probe 5 includes a probe surface having a piezoelectric element inside. The ultrasonic probe 5 that receives a voltage generates an ultrasonic wave from the probe surface according to the voltage. When the probe surface receives an ultrasonic wave, the ultrasonic probe 5 generates an electric signal indicating the received ultrasonic wave. The electric signal is an analog signal due to a change in voltage value.

The water tank 6 stores water 6a inside. The inspection object 7 is supported in the water 6a by a sample table 6b inside the water tank 6. The water 6a functions as a medium that propagates the ultrasonic waves that the ultrasonic probe 5 generates to the inspection object 7. As an example, the inspection object 7 is a composite material configured with an aluminum layer 71 and a CFRP (Carbon Fiber Reinforced Plastics) layer 72. The inspection object 7 reflects the propagated ultrasonic wave. The sample table 6b supports the inspection object 7 so that the ultrasonic waves propagated to the inspection object 7 do not propagate to the water tank 6.

The ultrasonic probe 5 irradiates the inspection object 7 with ultrasonic waves. Further, the ultrasonic probe 5 receives the ultrasonic waves that the inspection object 7 has reflected. In the case where the ultrasonic wave which the ultrasonic probe 5 irradiates is defined to be U, the ultrasonic wave reflected from the inspection object 7 includes a fundamental wave having the same frequency as the ultrasonic wave U, and an n-th harmonic having a frequency n times the frequency of the ultrasonic wave U (n is a natural number). It is called scanning that the ultrasonic probe 5 irradiates the inspection object 7 with the ultrasonic waves U and receives the ultrasonic waves reflected from the inspection object 7. The ultrasonic waves obtained by scanning the inspection object 7 include at least a fundamental wave and a second harmonic.

The ultrasonic probe 5 scans the inspection object 7 with an ultrasonic wave at a predetermined position. Then, the drive unit 4 moves the ultrasonic probe 5. The ultrasonic probe 5 again scans the inspection object 7 with an ultrasonic wave at the position where it has been moved. The drive unit 4 moves the ultrasonic probe 5 along a predetermined path. The path that the control device 1 controls is preset by the control device 1 to comprehensively scan the inspection object 7 with an ultrasonic wave on the XY plane.

The ultrasonic probe 5 is connected to the ultrasonic inspection apparatus 10 via the high frequency filter 8 and the pulse receiver 9. The ultrasonic probe 5 sends an ultrasonic wave obtained by scanning the inspection object 7 to the ultrasonic inspection apparatus 10 as an electric signal.

The high frequency filter 8 includes, for example, an electric circuit having a variable resistor and a variable capacitor. The high frequency filter 8 reduces low frequency components lower than a predetermined frequency from the electric signal sent from the ultrasonic probe 5. The electric signal sent from the ultrasonic probe 5 includes components indicating an ultrasonic wave obtained by scanning the inspection object 7, as well as components due to a fluctuation of the power supply voltage and a disturbance such as a radiated radio wave. An electric signal indicating an ultrasonic wave obtained by scanning the inspection object 7 contains a large amount of high frequency components, and therefore passes through the high frequency filter 8. On the other hand, fluctuations in the power supply voltage and disturbances such as radiated radio waves include a large amount of low frequency components and are therefore reduced by the high frequency filter 8.

The pulse receiver 9 receives an electric signal indicating an ultrasonic wave obtained by scanning the inspection object 7 via the high frequency filter 8. The pulse receiver 9 includes, for example, an electric circuit having an operational amplifier and an A/D (analog-digital converter). The pulse receiver 9 converts a change in the voltage value of the received electric signal into a digital signal. The digital signal is a rectangular wave of voltage value. The pulse receiver 9 sends a digital signal indicating a fundamental wave and a second harmonic to the ultrasonic inspection apparatus 10.

The ultrasonic inspection apparatus 10 outputs information on a defect of the inspection object 7 based on ultrasonic waves obtained by scanning the inspection object 7.

[Configuration of Ultrasonic Inspection Apparatus]

Figure 2:
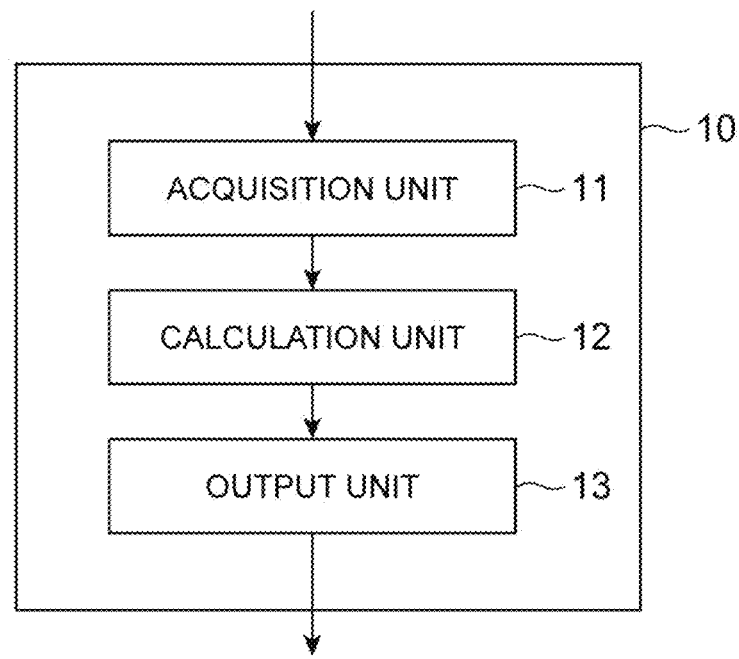
FIG. 2 is a block diagram showing functions of the ultrasonic inspection apparatus of FIG. 1.

FIG. 2 is a block diagram showing functions of the ultrasonic inspection apparatus of FIG. 1. The ultrasonic inspection apparatus 10 includes an acquisition unit 11, a calculation unit 12, and an output unit 13. The ultrasonic inspection apparatus 10 is configured with a general-purpose computer having an arithmetic device such as a CPU (Central Processing Unit), a storage device such as a ROM (Read Only Memory), a RAM (Random Access Memory), and an HDD (Hard Disk Drive), and a communication device.

The acquisition unit 11 acquires the fundamental wave and the second harmonic of the ultrasonic wave, obtained by the ultrasonic probe 5 scanning the inspection object 7, based on the digital signal sent from the pulse receiver 9. In addition, the acquisition unit 11 acquires the position information of the ultrasonic probe 5 that the drive unit 4 has fed back, from the control device 1. The acquisition unit 11 collates the acquired fundamental wave and second harmonic of the ultrasonic wave with the position information fed back from the drive unit 4, to associate the fundamental ultrasonic wave and the second harmonic wave, obtained by the ultrasonic probe 5 scanning the inspection object 7, with the position information at the time that the ultrasonic probe 5 has scanned the inspection object 7. That is, the acquisition unit 11 acquires signals indicating the fundamental wave and the second harmonic at each scanning position on the path of the ultrasonic probe 5.

The calculation unit 12 calculates a value obtained by dividing the second harmonic amplitude by the square of the fundamental wave amplitude, from the signal indicating the fundamental wave and the second harmonic acquired by the acquisition unit 11. The principle for outputting information on the defect of the inspection object 7 is described below.

Figure 3:
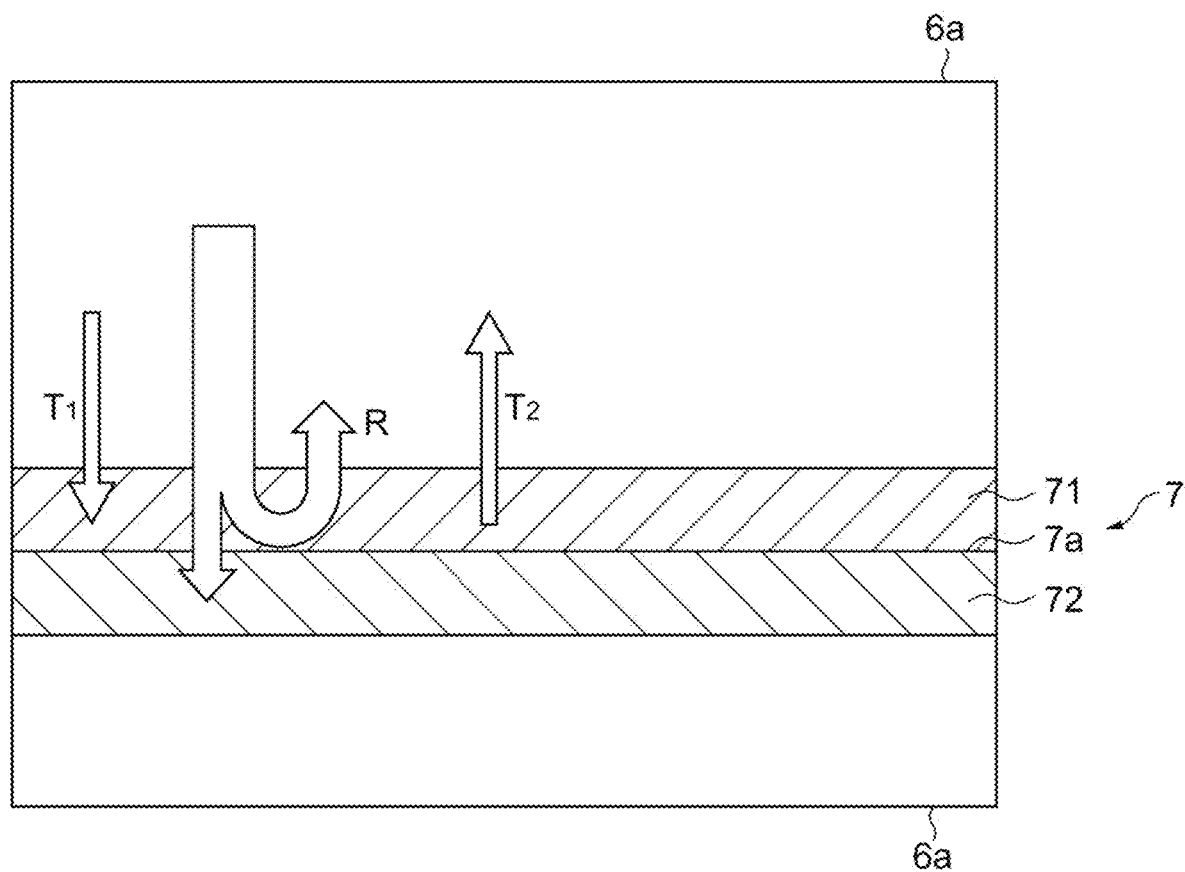
FIG. 3 is a schematic diagram illustrating a propagation path of an ultrasonic wave that scans an inspection object 7.

FIG. 3 is a schematic diagram illustrating the propagation path of ultrasonic waves that scan the inspection object 7. The ultrasonic waves transmitted from the ultrasonic probe 5 (see FIG. 1) penetrates from the water 6a to the aluminum layer 71. The ultrasonic wave that has penetrated from the water 6a to the aluminum layer 71 reflects at the adhesive interface 7a. The ultrasonic waves that has reflected at the adhesive interface 7a penetrates from the aluminum layer 71 to the water 6a. The ultrasonic wave that has been propagated through the water 6a is received by the ultrasonic probe 5. Here, the ultrasonic longitudinal wave sound velocity C of a linear continuum according to Hooke's law is generally represented by Formula (1), using the material density $\rho$, the longitudinal elastic modulus E and the Poisson's ratio $\nu$.

$$C = \sqrt{\frac{E(1-\nu)}{\rho(1+\nu)(1-2\nu)}} \quad (1)$$

However, the relationship between stress and strain determined by atomic force indicates nonlinearity. In the case of considering up to the quadratic term of strain $\varepsilon$, the stress $\sigma$ is represented by Formula (2), using the second-order elastic constant $C_{1W}$ of the propagation path affected by the nonlinearity of water and the third-order elastic constant $C_{2W}$ of the propagation path affected by the nonlinearity of water.

$$\sigma = C_{1W}\varepsilon + C_{2W}\varepsilon^2 \quad (2)$$

The displacement u of the one-dimensional wave equation of the elastic body according to Formula (2) is given by Formula (3).

$$u = A_{1W}\exp\{i(kx-\omega t)\}\varepsilon + \frac{C_{2W}}{8C_{1W}}A_{1W}^2 k^2 x \exp\{2i(kx-\omega t)\} \quad (3)$$

k represents the wave number, x represents the propagation distance, ω represents the angular frequency, t represents the time, and i represents the imaginary unit. $A_{1W}$ represents the fundamental wave amplitude with the same frequency as that of the ultrasonic wave U that the ultrasonic probe 5 has transmitted, in which the fundamental wave amplitude is affected by the nonlinearity of the water 6a.

The fundamental wave amplitude $A_1$ and the second harmonic amplitude $A_2$ of the ultrasonic wave obtained by scanning the inspection object 7 through the propagation path shown in FIG. 3 are represented by Formula (4) and Formula (5), based on Formula (3).

$$A_1 = RT_1T_2A_{1W} \quad (4)$$

$$A_2 = RT_1T_2 \frac{C_{2W}}{8C_{1W}} A_{1W}^2 k^2 x + T_2\alpha \quad (5)$$

R represents the reflectance of the adhesive interface 7a, $T_1$ represents the transmittance from the water 6a to the aluminum layer 71, $T_2$ represents the transmittance from the aluminum layer 71 to the water 6a, and a represents the signal due to clapping.

The value obtained by dividing the second harmonic amplitude by the square of the fundamental wave amplitude is represented by Formula (6) due to Formulas (4) and (5).

$$\frac{A_2}{A_1^2} = \frac{1}{RT_1T_2}\frac{C_{2W}}{8C_{1W}}k^2 x + \frac{T_2\alpha}{R^2T_1^2T_2^2A_{1W}^2} \quad (6)$$

In Formula (6) representing the ratio of the second harmonic amplitude of the ultrasonic wave obtained by scanning the inspection object 7 and the value of the square of the fundamental wave amplitude of the ultrasonic wave, the term of $A_{1W}$ affected by the nonlinearity of the water 6a is deleted from the first term on the right side. Further, the second term on the right side including the signal α due to the clapping is sufficiently small. Thereby, a value that reduces the effect of the nonlinearity of the water 6a is calculated in the calculation unit 12. The calculation unit 12 calculates a value obtained by dividing the second harmonic amplitude by the square of the fundamental wave amplitude at each scanning position on the path of the ultrasonic probe 5.

The output unit 13 outputs information on the defect of the inspection object 7 at each scanning position of the path of the ultrasonic probe 5, based on the value obtained by dividing the second harmonic amplitude by the square of the fundamental wave amplitude, calculated by the calculation unit 12. The defect of the inspection object 7 is a section where the elastic constant generated inside the inspection object 7 changes discontinuously, and is, for example, a fine crack generated at the adhesive interface 7a between the aluminum layer 71 and the CFRP layer 72. The ratio of the third-order elastic constant $C_{2W}$ affected by water nonlinearity and the second-order elastic constant $C_{1W}$ affected by water nonlinearity, in the first term on the right side of Formula (6) changes according to the defect state of the inspection object 7. Therefore, the ratio includes the defect information. The state of defects is, for example, the width and area of a fine crack generated in the adhesive interface 7a. Therefore, in the value obtained by dividing the second harmonic amplitude by the square of the fundamental wave amplitude shown in Formula (6), information on the defect of the inspection object 7 is included, in which the effect of the nonlinearity of the water 6a is reduced. The output unit 13 applies a predetermined pixel value conversion rule to the value obtained by dividing the second harmonic amplitude by the square of the fundamental wave amplitude shown in Formula (6), and generates an image based on the converted pixel value. For example, the output unit 13 may multiply the values obtained at each scanning position by a predetermined conversion coefficient to convert the value into pixel values, and generate an image based on the converted pixel values. That is, the image has pixel values corresponding to each scanning position. As a specific example of the predetermined pixel value conversion rule, a procedure for generating a grayscale image will be described. First, the output unit 13 associates the scanning position with the pixel position included in the image. Next, the output unit 13 associates the gradation of the image with the defect information. The output unit 13 associates the defect information with the gradation so that the range of the defect information obtained at each scanning position is within the gradation of the grayscale image and the defect information is proportional to the gradation. For example, the output unit 13 associates the minimum value of the defect information with the tone (black) with the weakest light, and associates the maximum value of the defect information with the tone (white) with the strongest light. When the gradation is expressed by 8 bits, the pixel value 0 is the minimum value of the defect information, and corresponds to $A_2/A_1^2$ of the sound portion. The pixel value 255 is the maximum value of the defect information, and corresponds to $A_2/A_1^2$ of the defective portion. According to this conversion rule, an image indicating that a position having a color closer to white is a defective portion is output. The output unit 13 may electrically divide the image signal corresponding to the scanning position to convert the image signal into an image signal corresponding to a finer scanning position. In this case, the accuracy of the boundary value between the sound portion (black) and the defective portion (white) can be improved. In addition, the output unit 13 may set a threshold value based on the $A_2/A_1^2$ of the sound portion and automatically indicate the portion having the defect. For example, the output unit 13 can preset $A_2/A_1^2$ at a sound location as a threshold value, and indicate a pixel value corresponding to $A_2/A_1^2$ larger than the threshold value as a defective location.

Figure 4A:
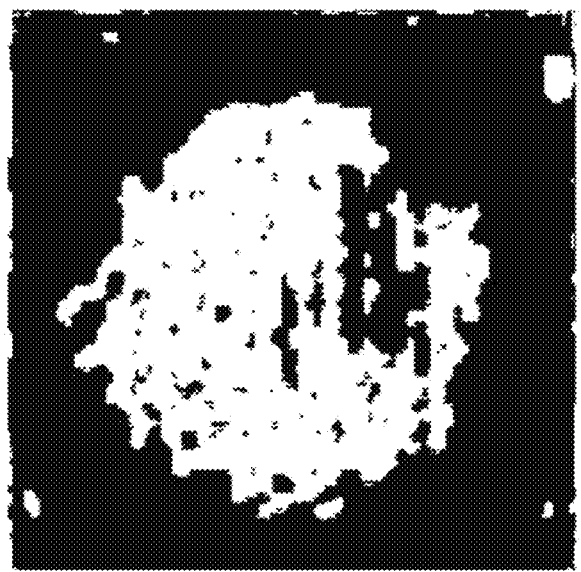
FIGS. 4A and 4B are examples of information on a defect of an inspection object.
Figure 4B:
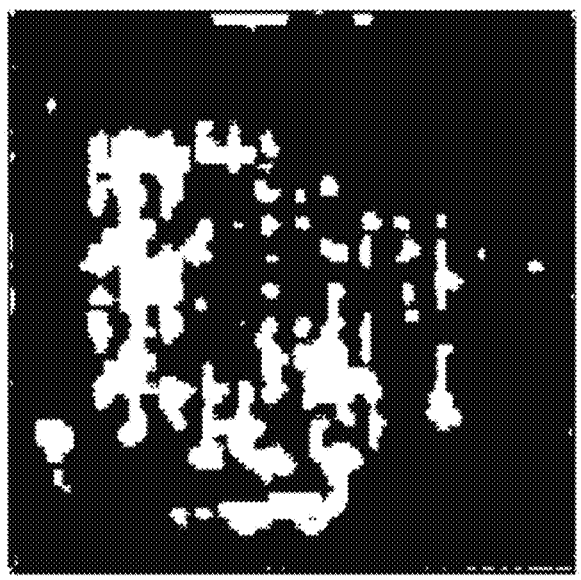

FIGS. 4A and 4B are examples of information on a defect of an inspection object. FIG. 4A shows information on the defect of the inspection object 7, which information is output based on the value calculated by dividing the second harmonic amplitude by the square of the fundamental wave amplitude based on an experiment. The information on the defect of the inspection object 7 is output by the output unit 13 as an image on a two-dimensional plane corresponding to the scanning position of the path of the ultrasonic probe 5. FIG. 4B shows information on the defect of the inspection object 7, which information is output based on the value calculated by dividing the second harmonic amplitude by the fundamental wave amplitude based on an experiment. It is confirmed that the information of the defect of the inspection object 7 spreading in a circular shape is accurately visualized in FIG. 4A as compared with FIG. 4B.

[Operation of Ultrasonic Inspection Apparatus]

Figure 5:
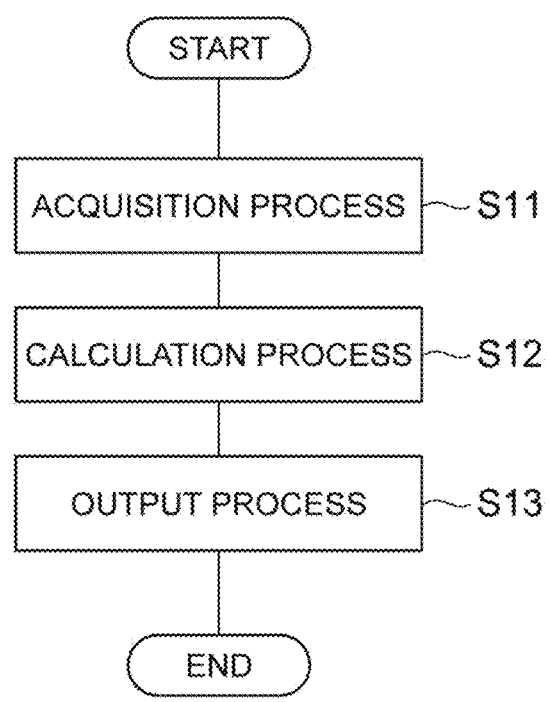
FIG. 5 is a flowchart showing processes of an ultrasonic inspection method.

FIG. 5 is a flowchart showing processes of the ultrasonic inspection method. The flowchart shown in FIG. 5 is executed by the ultrasonic inspection apparatus 10.

As shown in FIG. 5, the ultrasonic inspection apparatus 10 first performs an acquisition process (step S11) to acquire a position where the ultrasonic probe 5 scans the inspection object 7, and a fundamental wave and a second harmonic of ultrasonic waves obtained by scanning the inspection object 7. The acquisition process (step S11) is based on the digital signal output from the pulse receiver 9 and the feedback from the drive unit 4.

Subsequently, the ultrasonic inspection apparatus 10 performs a calculation process (step S12) of calculating the value obtained by dividing the second harmonic amplitude by the square of the fundamental amplitude, from the acquired fundamental wave and second harmonic, at each position where the ultrasonic probe 5 scans the inspection object 7. In the calculation process (step S12), as described above with respect to Formula (6), the information on the defect of the inspection object 7 is calculated in which the effect of the nonlinearity of the water 6a is reduced.

Subsequently, the ultrasonic inspection apparatus 10 performs an output process (step S13) of outputting information on the defect of the inspection object 7 based on the value obtained by dividing the second harmonic amplitude by the square of the fundamental wave amplitude. The information on the defect of the inspection object 7 such as the width and area of the fine crack that the adhesive interface 7a includes is output by the change in the value obtained by dividing the second harmonic amplitude by the square of the fundamental wave amplitude. The information on the defect of the inspection object 7 is output as an image, for example. When the output process (step S13) ends, the flowchart shown in FIG. 5 ends.

[Summary of Embodiments]

According to the ultrasonic inspection apparatus 10 and the ultrasonic inspection method, the signals indicating the fundamental wave and the second harmonic of the ultrasonic wave, obtained by the ultrasonic probe 5 scanning the inspection object 7, are acquired by the acquisition unit 11 at each scanning position on the path of the ultrasonic probe 5. A value obtained by dividing the second harmonic amplitude by the square of the fundamental wave amplitude is calculated by the calculation unit 12 at each scanning position on the path of the ultrasonic probe 5. Based on the value obtained by dividing the second harmonic amplitude by the square of the fundamental wave amplitude, information on the defect of the adhesive interface 7a of the inspection object 7 is output from the output unit 13 in which the effect of the nonlinearity of the water 6a is reduced. In this way, the ultrasonic inspection apparatus 10 can output the defect of the inspection object 7 in which the effect of the nonlinearity of the water 6a is reduced. Therefore, the ultrasonic inspection apparatus 10 and the ultrasonic inspection method can improve the detection accuracy for the defect of the inspection object 7, compared with that in the case of detecting the defect of the inspection object 7 based on the value of the ratio ($A_2/A_1$) of the second harmonic amplitude of the ultrasonic wave and the fundamental wave amplitude of the ultrasonic wave.

The output unit 13 can output an image as information on the defect of the inspection object 7. The ultrasonic inspection apparatus 10 can visualize the defect in the inspection object 7.

[Modification]

Although various exemplary embodiments have been described above, the present disclosure is not limited to the exemplary embodiments described above, and various omissions, substitutions, and changes may be made.

The output unit 13 need not output the information on the defect of the inspection object 7 in an image. The output unit 13 may output a change in a value obtained by dividing the second harmonic amplitude by the square of the fundamental wave amplitude in a graph, for example. The output unit 13 may output the inspection result based on the information on the defect of the inspection object 7. The inspection result may be a determination result of a non-defective product or a defective product of the inspection object 7, for example.

The calculation unit 12 may calculate a value obtained by dividing the second harmonic amplitude by the fundamental wave amplitude, of the ultrasonic wave obtained by scanning, at each scanning position of the path of the ultrasonic probe 5, and the output unit 13 may output the information on the defect of the inspection object 7 based on the value obtained by dividing the second harmonic amplitude by the fundamental wave amplitude, and the value obtained by dividing the second harmonic amplitude by the square of the fundamental wave amplitude. The principle for outputting information on the defect of the inspection object 7 is described below.

Figure 6:
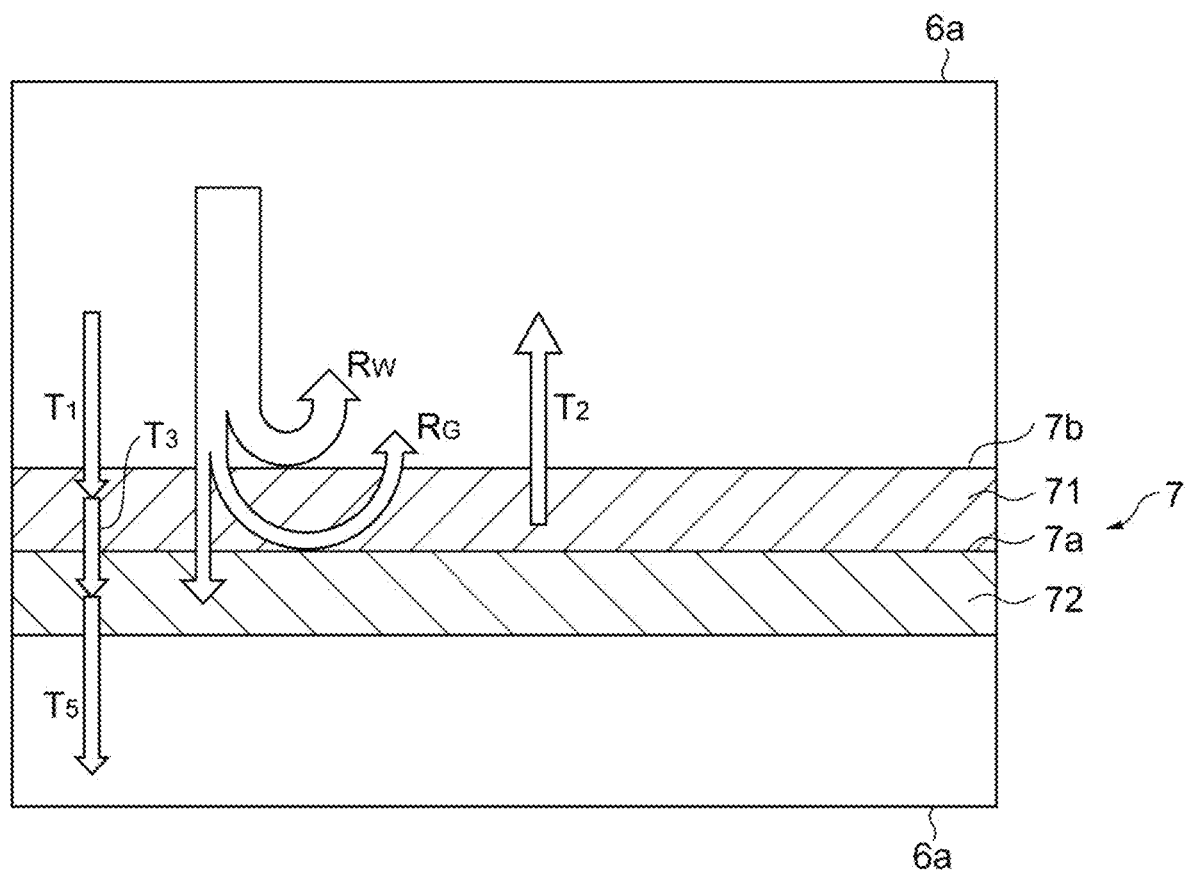
FIG. 6 is a schematic diagram illustrating a plurality of propagation paths of ultrasonic waves that scan the inspection object 7.

FIG. 6 is a schematic diagram illustrating a plurality of propagation paths of ultrasonic waves that scan the inspection object 7. The ultrasonic wave propagation paths obtained by scanning the inspection object 7 includes a path when ultrasonic waves are reflected on the external interface 7b between the aluminum layer 71 and the water 6a, a path when ultrasonic waves are reflected on the sound part of the adhesive interface 7a of the inspection object 7, and a path when ultrasonic waves are reflected on the defective part of the adhesive interface 7a of the inspection object 7. The reflectance of the external interface 7b between the aluminum layer 71 and the water 6a is $R_W$, and the reflectance of the sound part of the adhesive interface 7a of the inspection object 7 is $R_G$. Since neither interfaces have nonlinearity, $A_2/A_1^2$ and $A_2'/A_1'^2$ are represented by Formulas (7) and (8) if the signal due to the clapping $\alpha=0$.

$$\frac{A_2}{A_1^2} = \frac{1}{R_W T_1 T_2} \frac{C_{2W}}{8 C_{1W}} k^2 x \quad (7)$$

$$\frac{A_2'}{A_1'^2} = \frac{1}{R_G T_1 T_2} \frac{C_{2W}}{8 C_{1W}} k^2 x \quad (8)$$

$A_1'$ represents the fundamental wave amplitude of the ultrasonic wave reflected on the sound part of the adhesive interface 7a of the inspection object 7. $A_2'$ represents the second harmonic amplitude of the ultrasonic wave reflected on the sound part of the adhesive interface 7a of the inspection object 7. The ratio between Formula (7) and Formula (8) is represented by Formula (9).

$$\frac{A_2'}{A_1'^2} \bigg/ \frac{A_2}{A_1^2} = \frac{R_W}{R_G} \quad (9)$$

Using Formula (4), the ratio of the amplitude of the fundamental wave reflected on the external interface 7b between the aluminum layer 71 and the water 6a to the amplitude of the fundamental wave reflected from the sound part of the adhesive interface 7a of the inspection object 7 is represented by Formula (10).

$$\frac{A_1}{A_1'} = \frac{R_W}{R_G} \qquad (10)$$

Here, when Formula (9) is transformed with Formula (10), Formula (11) is obtained.

$$\frac{A_2'}{A_1'^2} \bigg/ \frac{A_2}{A_1^2} = \frac{1/R_G}{1/R_W} = \frac{A_1}{A_1'} \qquad (11)$$

If both sides of Formula (11) are rearranged, Formula (12) is obtained.

$$\frac{A_2'}{A_1'} = \frac{A_2}{A_1} \qquad (12)$$

The reflectance at the defective part of the adhesive interface 7a of the inspection object 7 is $R_F$, the fundamental wave amplitude of the ultrasonic wave reflected on the defective part of the adhesive interface 7a of the inspection object 7 is $A_1'$, and the second harmonic amplitude of the ultrasonic wave reflected on the defective part of the adhesive interface 7a of the inspection object 7 is $A_2'$. If $A_2''/A_1''$ is found in the same manner as the transformation of the above-mentioned formula, Formula (13) is obtained.

$$\frac{A_1}{A_1''} = \frac{R_W}{R_F} \qquad (13)$$

$$\frac{A_2''}{A_1''^2} \bigg/ \frac{A_2}{A_1^2} = \frac{\frac{1}{R_F T_1 T_2} \frac{C_{2W}}{8C_{1W}} k^2 x + \frac{T_2 \alpha}{R_F^2 T_1^2 T_2^2 A_{1W}^2}}{\frac{1}{R_W T_1 T_2} \frac{C_{2W}}{8C_{1W}} k^2 x} =$$

$$\frac{1/R_F}{1/R_W} + \frac{\frac{T_2 \alpha}{R_F^2 T_1^2 T_2^2 A_{1W}^2}}{\frac{1}{R_W T_1 T_2} \frac{C_{2W}}{8C_{1W}} k^2 x} =$$

$$\frac{R_W}{R_F} + \frac{A_1^2}{A_2} \frac{T_2 \alpha}{R_F^2 T_1^2 T_2^2 A_{1W}^2} = \frac{A_1}{A_1''} + \frac{A_1^2}{A_2} \frac{T_2 \alpha}{R_F^2 T_1^2 T_2^2 A_{1W}^2}$$

If both sides of Formula (13) is rearranged to summarize the terms including α by A(α), Formula (14) is obtained.

$$\frac{A_2''}{A_1''} = \frac{A_2}{A_1} + A(\alpha) \qquad (14)$$

The ratio between the second harmonic amplitude of the ultrasonic wave and the fundamental wave amplitude of the ultrasonic wave obtained by scanning the ultrasonic wave, which Formula (12) and Formula (14) represent, is a constant value except for the term A(α), whether the ultrasonic wave is reflected on any of the external interface 7b, the internal adhesive interface 7a, or the defective part of the inspection object 7. That is, in the fundamental wave amplitude and the second harmonic amplitude of the ultrasonic wave reflected through different propagation paths, the effect due to the reflectance is reduced by taking the ratio of the second harmonic amplitude of ultrasonic wave and the fundamental wave amplitude of ultrasonic wave. In this state where the effect is reduced, the relationship between the fundamental wave amplitude of ultrasonic wave and the second harmonic amplitude of ultrasonic wave can be described.

At each scanning position of the path of the ultrasonic probe 5, the calculation unit 12 calculates the value obtained by dividing the second harmonic amplitude of the ultrasonic wave by the fundamental wave amplitude of the ultrasonic wave, and the value obtained by dividing the second harmonic amplitude of the ultrasonic wave by the square of the fundamental wave amplitude of the ultrasonic wave.

The output unit 13 outputs information on the defect of the inspection object 7, based on the value obtained by dividing the second harmonic amplitude of the ultrasonic wave by the fundamental wave amplitude of the ultrasonic wave, and the value obtained by dividing the second harmonic amplitude by the square of the fundamental amplitude, which the calculation unit 12 has calculated. Specifically, the output unit 13 compares an image output based on the value obtained by dividing the second harmonic amplitude by the fundamental wave amplitude, and an image output based on the value obtained by dividing the second harmonic amplitude by the square of the fundamental wave amplitude. The output unit 13 compares the images to output that the defect is erroneously detected due to an effect that the reflectance of the ultrasonic wave gives on the amplitude when the percentage in which the defect positions coincide is lower than a certain value. Therefore, the ultrasonic inspection apparatus 10 can reduce the effect that the reflectance of ultrasonic waves gives on the amplitude, based on the ratio of the ultrasonic second harmonic amplitude to the ultrasonic fundamental wave amplitude, and ratio of second harmonic amplitude of ultrasonic wave to squared value of ultrasonic fundamental wave amplitude.

The acquisition unit 11 may acquire the ultrasonic wave that penetrates through and scans the inspection object 7. The principle for outputting information on the defect of the inspection object 7 is described below.

The ultrasonic waves that scan the inspection object 7 penetrate through the external interface 7b between the aluminum layer 71 and the water 6a, the adhesive interface 7a of the inspection object 7, and between the CFRP and the water 6a. In this case, the fundamental wave amplitude and the second harmonic amplitude that have penetrated through the inspection object 7 are represented by Formulas (15) and (16).

$$A_1 = T_5 T_1 T_3 A_{1W} \qquad (15)$$

$$A_2 = T_5 T_1 T_3 \frac{C_{2W}}{8C_{1W}} A_{1W}^2 k^2 x + T_5 \alpha \qquad (16)$$

$T_3$ represents the transmittance from the aluminum layer 71 to the CFRP layer 72. $T_5$ represents the transmittance from the CFRP layer 72 to the water 6a. In the case of acquiring an ultrasonic wave that penetrates through and scans over the inspection object 7, the value obtained by dividing the second harmonic amplitude by the square of the fundamental wave amplitude is represented by Formula (17) according to Formulas (15) and (16).

$$\frac{A_2}{A_1^2} = \frac{1}{T_5 T_1 T_3} \frac{C_{2W}}{8 C_{1W}} k^2 x + \frac{T_5 \alpha}{T_5^2 T_1^2 T_3^2 A_{1W}^2} \quad (17)$$

In Formula (17), similarly to Formula (6), the ratio between the second harmonic amplitude of the ultrasonic wave and the squared value of the fundamental wave amplitude of the ultrasonic wave indicates that the $A_{1W}$ term affected by the nonlinearity of the water 6a has disappeared from the first term on the right side. Therefore, also in the case where the acquisition unit 11 acquires an ultrasonic wave that penetrates through and scans the inspection object 7, the ultrasonic inspection apparatus 10 can output the defect of the inspection object 7 in which the apparatus reduces the effect of the nonlinearity of the water 6a, similarly to in the case of acquiring the ultrasonic waves reflecting on and scanning the inspection object 7.

REFERENCE SIGNS LIST

100 . . . ultrasonic inspection system, 1 . . . control device, 2 . . . pulse generator, 3 . . . divider, 4 . . . drive unit, 5 . . . ultrasonic probe, 6 . . . water tank, 7 . . . inspection object, 8 . . . high frequency filter, 9 . . . pulse receiver, 10 . . . ultrasonic inspection apparatus, 11 . . . acquisition unit, 12 . . . calculation unit, 13 . . . output unit

What is claimed is:

1. An ultrasonic inspection apparatus, comprising:
an acquisition unit configured to acquire a signal indicating a fundamental wave and a second harmonic of an ultrasonic wave, the fundamental wave and the second harmonic being obtained by the ultrasonic wave being scanned over an inspection object through water, at each scanning position, the inspection object being a composite material configured with an aluminum layer and a CFRP layer;
a calculation unit configured to calculate a value obtained by dividing a second harmonic amplitude by a square of a fundamental wave amplitude and a value obtained by dividing the second harmonic amplitude by the fundamental wave amplitude, at each scanning position; and
an output unit configured to output images showing defect positions of the composite material, based on the value obtained by dividing the second harmonic amplitude by the square of the fundamental wave amplitude and the value obtained by dividing the second harmonic amplitude by the fundamental wave amplitude,
wherein the defect of the composite material is a crack generated at an adhesive interface between the aluminum layer and the CFRP layer,
wherein the output unit compares the image output based on the value obtained by dividing the second harmonic amplitude by the square of the fundamental wave amplitude, and the image output based on the value obtained by dividing the second harmonic amplitude by the fundamental wave amplitude, and the output unit outputs that the defect is erroneously detected when the percentage in which the defect positions coincide is lower than a predetermined value.

2. An ultrasonic inspection method, comprising:
acquiring a signal indicating a fundamental wave and a second harmonic of an ultrasonic wave, the fundamental wave and the second harmonic being obtained by the ultrasonic wave being scanned over an inspection object through water, at each scanning position, the inspection object being a composite material with an aluminum layer and a CFRP layer;
calculating a value obtained by dividing a second harmonic amplitude by a square of a fundamental wave amplitude and a value obtained by dividing the second harmonic amplitude by the fundamental wave amplitude, at the each scanning position;
outputting images showing defect positions of the composite material, based on the value obtained by dividing the second harmonic amplitude by the square of the fundamental wave amplitude and the value obtained by dividing the second harmonic amplitude by the fundamental wave amplitude, the defect of the composite material being a crack generated at an adhesive interface between the aluminum layer and the CFRP layer;
comparing the image output based on the value obtained by dividing the second harmonic amplitude by the square of the fundamental wave amplitude, and the image output based on the value obtained by dividing the second harmonic amplitude by the fundamental wave amplitude; and
outputting that the defect is erroneously detected when the percentage in which the defect positions coincide is lower than a predetermined value.

* * * * *